United States Patent [19]

Tudek

[11] Patent Number: 4,720,920
[45] Date of Patent: Jan. 26, 1988

[54] LEVEL WITH ELECTRONIC SIGNALS

[76] Inventor: Arthur L. Tudek, 507 Indiana Ave., Glassport, Pa. 15045

[21] Appl. No.: 343,486

[22] Filed: Jan. 28, 1982

[51] Int. Cl.$^4$ .............................................. G01C 9/06
[52] U.S. Cl. ...................................... 33/366; 33/348; 340/689
[58] Field of Search .......................... 33/366, 348, 367; 340/689

[56] References Cited

U.S. PATENT DOCUMENTS

| | | | |
|---|---|---|---|
| 3,172,212 | 3/1965 | Pappas | 33/366 |
| 3,786,472 | 1/1974 | Scopacasa | 33/366 X |
| 4,003,134 | 1/1977 | Adams | 33/366 |
| 4,079,521 | 3/1978 | Whorczak | 33/366 |
| 4,244,117 | 1/1981 | Cantarella et al. | 33/366 |

Primary Examiner—William D. Martin, Jr.
Attorney, Agent, or Firm—William J. Ruano

[57] ABSTRACT

A device that may be of different shapes and sizes to function as a level that emits an audio and visual signal when the device is level or parallel with gravity. It will also emit the same signals when the level is put in a vertical position and the device is plumb in one dimension; while at the same time will emit a different audio and visual signal when the level is moved and the bubble or amalgam will flow to the center of the other glass tube thus indicating that the other plane is level. In essence, both sets of signals will activate when the level is in true vertical position. The audio and visual signals are activated by D.C. current supplied by a dry cell battery. The liquid leveling agent is a drop of amalgam enclosed in a glass tube that is embedded in the body of the level. The contact points are also in the inner walls of the glass tube and traverse their circumference and at one point, they penetrate the walls of the glass tube to connect the outer surface; and are spaced the distance of the liquid amalgam when it rests in its extended state. The spaced contact points are a part of a simple open parallel circuit switch. Closing of the circuit will result when the amalgam flows to touch the contact points simultaneously when the device is level or plumb thus activating the electronic beep and the light signal.

1 Claim, 3 Drawing Figures

LEVEL WITH ELECTRONIC SIGNALS

BRIEF SUMMARY OF THE INVENTION

This invention relates to a device that alerts the user by an audio and visual signal when the said device or the project is level or plumb in reference with gravity. This invention is more consistentely accurate than the ordinary non-electric type because it will activate only when the device is in true level while the former is merely an estimate from eyesight. With this invention, the functions of leveling with a leveling device may now be available to people who have handicaps from a loss or lack of some of their senses.

CROSS REFERENCE TO PRIOR ART

Although different types of levels are commercially produced and used, none have given the level these added dimensions in accuracy and in aiding the handicapped.

SUMMARY OF THE INVENTION

The principal object of the present invention is to provide a level with a self contained power source to supply an audio and visual signal when the liquid amalgam bubble extends itself horizontally in a level position in reference to gravity and touching two contact points to complete the circuit and activating the signals.

Another object is to provide two audio and two visual signals when the said device is in true level in both of the planes of the horizontal and vertical direction.

Still another object of this device is to provide to the user a visual sighting of the position of the amalgam bubble because the device is not level resulting in no signals, to indicate if it is high or low and how far off the center of gravity.

These and other objects and advantages will be apparent as the specification is considered with the accompanying drawings, wherein:

FIG. 1 is a plan view of the level consisting of a long rectangular body with six compartments. Namely from left to right, a rectangular compartment that houses the power supply. A circular compartment is provided that houses a glass tube with amalgam and their contact points. Adjacent is another circular compartment that houses two glass tubes with amalgam and their contact points; the two glass tubes being molded together in the center at right angles to form a cross. Next is a circular compartment that houses one of the visual signals which is a light. Adjacent is a square compartment that houses the two electronic beepers. Completing FIG. 1 is the other circular compartment housing the other visual signal of a light.

DETAILED DESCRIPTION

Figure 1:
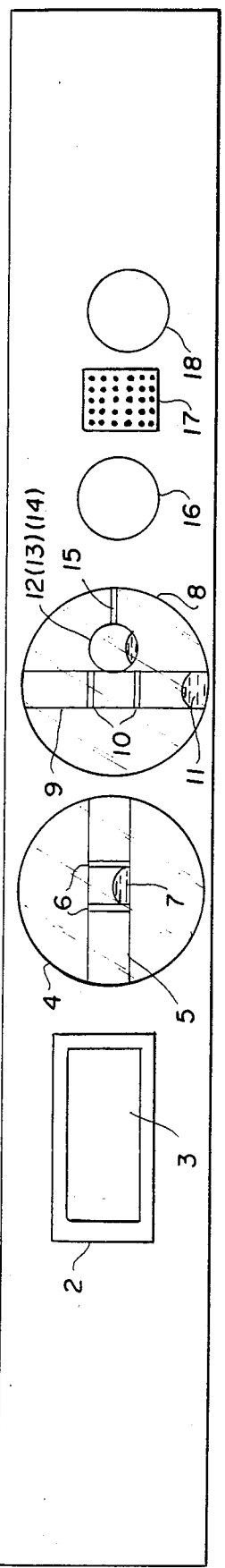
Figure 2:
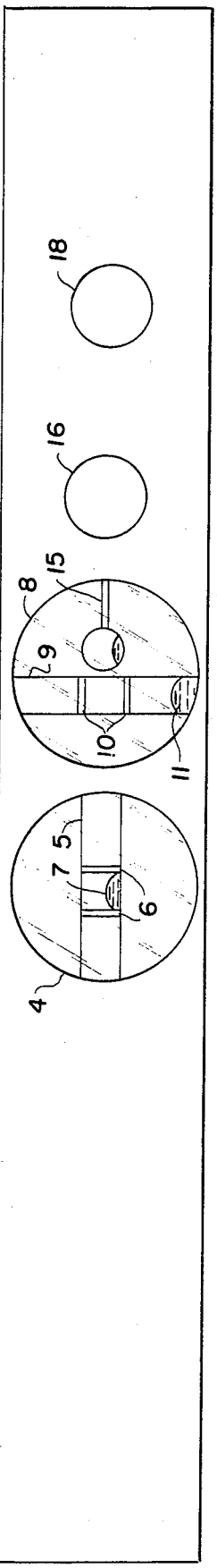
FIG. 2 is the plan view of the opposite side of FIG. 1.
Figure 3:
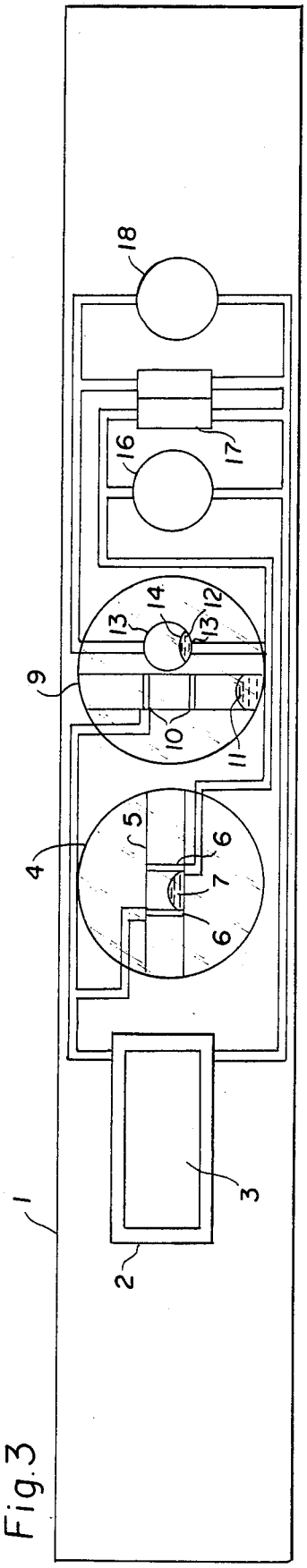
FIG. 3 is a diagrammatic view of the wiring circuit of the components listed above in FIG. 1.

Referring more particularly to the drawings, wherein as best shown in FIG. 1, numeral 1 identifies the body of the level and housed within the body 1 is a rectangular compartment 2 that holds the power supply which is a battery 3. Next a circular compartment 4 which houses the horizontal glass tube 5 and within the tube are two contact points 6 that envelope the inside circumference of the tube and are spaced apart the distance of the amalgam 7 when resting in its horizontal state. Another circular compartment 8 houses two glass tubes, a vertical glass tube 9 and within the tube are two contact points 10 that envelope the inside circumference of the tube and are spaced apart the distance of the amalgam when resting in its horizontal state, however the amalgam 11 is showing currently resting in the vertical state. The other glass tube 12, shown in its front view, (also contained are the contact points 13 and the amalgam 14) which is molded to glass tube 9 but in a horizontal fixation at the center and are of right angle position to form a cross. The glass tube 12 is connected to a support 15 that connects the edge of the circular compartment 8. Adjacent to the double glass compartment 8 is a smaller circular compartment 16 that houses one of the visual signals which is a light. Referring to the Figures, particularly FIG. 3, when the level is held horizontally, glass tube 5 indicates a horizontal level position has been attained when its contacts 6 are bridged with mercury 7, completing a circuit through light 16 and buzzer 17 and energizing the contact leading to the tube denoted 12, so that when the latter tube has its contacts 13 bridged by mercury 14, it will complete a circuit to light 18 and the buzzer 17 closest thereto. Thus, when both tubes have their contacts bridged simultaneously, this denotes attainment of a predetermined horizontal plane, such as that of a floor. Then the level is mounted vertically so that only the cruciform tubes 9 and 12 are operated to denote a particular vertical plane, such as that of a door when in a door jamb. The circuit may be traced from the negative terminal through the bridged contacts of tube 9 thence to light 16 and buzzer 17, energizing one of the contacts 13 of tube 12 so that when the latter tube contacts 13 are bridged by mercury 14, the circuit is completed through buzzer 17 and light 18. This completion of the circuit through both tubes 9 and 12 will indicate that a predetermined vertical plane, such as that of a door while in a door jamb, has been attained and indicated by the level. Next is a square compartment 17 with audio holes that houses the two electronic beepers. The last circular compartment 18 houses the other visual signal of a light.

While a preferred embodiment of a level that signals with an audio and visual sign for more accuracy and an aid to the handicapped has been herein shown and described, it is to be understood that various changes and improvements may be made therein without departing from the scope and spirit of the appended claims.

What I claim is:

1. A level for gauging predetermined horizontal and vertical planes, comprising three mercury type switches disposed at right angles to each other, two of said switches when simultaneously operated indicating said predetermined vertical plane and two other of them when simultaneously operated, indicating said predetermined horizontal plane, two of said mercury type switches being arranged closely together in cruciform relationship and the other extending along the longitudinal axis of the level and wherein the second switch of each of said two cannot be actuated until the first switch is bridged and actuates a signal.

* * * * *